US009264375B2

(12) United States Patent
DeCusatis et al.

(10) Patent No.: US 9,264,375 B2
(45) Date of Patent: *Feb. 16, 2016

(54) SOFTWARE-DEFINED NETWORKING INTERFACE BETWEEN MULTIPLE PLATFORM MANAGERS

(71) Applicant: International Business Machines Corporation, Armonk, NY (US)

(72) Inventors: Casimer M. DeCusatis, Poughkeepsie, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,205

(22) Filed: Sep. 30, 2014

(65) Prior Publication Data
US 2015/0172208 A1 Jun. 18, 2015

Related U.S. Application Data

(63) Continuation of application No. 14/105,247, filed on Dec. 13, 2013.

(51) Int. Cl.
*H04L 12/911* (2013.01)
*H04L 12/24* (2006.01)

(52) U.S. Cl.
CPC .............. *H04L 47/70* (2013.01); *H04L 41/08* (2013.01); *H04L 41/0803* (2013.01); *H04L 41/0893* (2013.01)

(58) Field of Classification Search
CPC . H01L 41/08; H01L 41/0803; H01L 41/0806; H01L 41/0813; H01L 41/0866; H01L 41/0893; H01L 47/70
USPC ................................................. 709/220–226
See application file for complete search history.

(56) References Cited

U.S. PATENT DOCUMENTS 7,120,680 B1 10/2006 Higgins et al.
7,484,242 B2 1/2009 Aggarwal et al.
(Continued)

FOREIGN PATENT DOCUMENTS

EP 2571210 3/2013
JP 2012186649 9/2012
(Continued)

OTHER PUBLICATIONS

Bakshi, "Considerations for Software Defined Networking (SDN): Approaches and Use Cases," 2013 IEEE Aerospace Conference, Mar. 9, 2013, pp. 1-9.

(Continued)

*Primary Examiner* — Michael Y Won
*Assistant Examiner* — William C McBeth
(74) *Attorney, Agent, or Firm* — Cantor Colburn LLP; Steven Chiu

(57) ABSTRACT

Embodiments relate to a software-defined networking (SDN) interface between multiple platform managers. An aspect is a computer-implemented method for receiving, at an SDN controller of a network, provisioning data from a first network provisioning application associated with a first platform manager of a first computing platform. Provisioning data are received at the SDN controller from a second network provisioning application associated with a second platform manager of a second computing platform. The SDN controller compares the provisioning data from the first network provisioning application to the provisioning data from the second network provisioning application to identify provisioning issues. The SDN controller determines a modified provisioning that resolves the provisioning issues. The SDN controller configures the network to comply with the modified provisioning. The modified provisioning is reported to the first and second network provisioning applications.

17 Claims, 5 Drawing Sheets

(56) References Cited

U.S. PATENT DOCUMENTS

| | | | |
|---|---|---|---|
| 7,602,736 B2* | 10/2009 | Schoeberl | H04L 41/12 370/241 |
| 7,760,643 B2 | 7/2010 | Kim et al. | |
| 7,987,444 B2* | 7/2011 | Fuller, III | H04L 67/36 345/630 |
| 8,000,346 B2 | 8/2011 | Yong et al. | |
| 8,149,771 B2 | 4/2012 | Khivesara et al. | |
| 2007/0058570 A1* | 3/2007 | Singh | H04L 41/0866 370/254 |
| 2009/0180430 A1* | 7/2009 | Fadell | H04L 47/808 370/329 |
| 2009/0228953 A1 | 9/2009 | Hu et al. | |
| 2013/0060922 A1 | 3/2013 | Koponen et al. | |
| 2013/0259465 A1 | 10/2013 | Blair | |
| 2014/0052836 A1 | 2/2014 | Nguyen et al. | |
| 2014/0075519 A1 | 3/2014 | Porras et al. | |
| 2014/0122668 A1* | 5/2014 | Nieminen | H04L 41/0803 709/220 |
| 2014/0237111 A1 | 8/2014 | McMurry et al. | |
| 2014/0280864 A1 | 9/2014 | Yin et al. | |
| 2015/0142958 A1* | 5/2015 | Tamura | H04L 67/1008 709/224 |

FOREIGN PATENT DOCUMENTS

| | | |
|---|---|---|
| JP | 2013239913 | 11/2013 |
| JP | 2013246676 | 12/2013 |
| WO | WO2012101890 | 8/2012 |

OTHER PUBLICATIONS

Banikazemi et al., "Meridian: An SDN Platform for Cloud Network Services," IEEE Communications Magazine, vol. 51, No. 2, Feb. 2013, pp. 120-127.

Bari et al., "PolicyCop: An Automatic QoS Policy Enforcement Framework for Software Defined Networks," IEEE SDN for Future Networks and Services, Nov. 11-13, 2013, pp. 1-7.

Benson et al., "CloudNaaS: A Cloud Networking Platform for Enterprise Applications," Proceedings of the 2nd ACM Symposium on Cloud Computing, Oct. 28, 2011, 13 pages.

C. DeCusatis, et al., "Dynamic software-defined service provider network infrastructure and cloud drivers for SDN adoption," Communications Workshop (ICC), 2013 IEEE International Conference on, Jun. 9, 2013, pp. 235-239.

Ferguson et al., "Participatory Networking: An API for Application Control of SDNs," Proceedings of the ACM SIGCOMM 2013, Aug. 12-16, 2013, pp. 327-338.

International Application No. PCT/JP2014/005347 International Search Report and Written Opinion dated Jan. 27, 2015, 7 pages.

Liu et al., "M2cloud: Software Defined Multi-site Data Center Network Control Framework for Multi-tenant," Proceedings of the ACM SIGCOMM 2013, Aug. 12-16, 2013, pp. 517-518.

McKeown et al., "OpenFlow: Enabling Innovation in Campus Networks," ACM SIGCOMM Computer Communication Review, vol. 38, No. 2, Apr. 2008, pp. 69-74.

Mechtri et al., "SDN for Inter Cloud Networking," 2013 IEEE SDN for Future Networks and Services, Nov. 13, 2013, pp. 1-7.

Natarajan et al., "Efficient Conflict Detection in Flow-Based Virtualized Networks," 2012 International Conference on Computing, Networking and Communications (ICNC), Feb. 2, 2012, pp. 690-696.

Porras et al., "A Security Enforcement Kernel for OPenFlow Networks," Proceedings of the First Workshop on Hot topics in Software Defined Networks, Aug. 13, 2012, pp. 121-126.

U.S. Appl. No. 14/105,247 Non Final Office Action dated Dec. 19, 2014, 102 pages.

C. Monsanto, et al., "Composing Software-Defined Networks," nsdi'13 Proceedings of the 10th USENIX conference on Networked Systems Design and Implementation, Apr. 2, 2013, 13 pages.

T. Koponen, et al., "Onix: A Distributed Control Platform for Large-scale Production Networks," OSDI'10 Proceedings of the 9th USENIX conference on Operating systems design and implementation Article No. 1-6, Oct. 4, 2010, 14 pages.

* cited by examiner

US 9,264,375 B2

SOFTWARE-DEFINED NETWORKING INTERFACE BETWEEN MULTIPLE PLATFORM MANAGERS

DOMESTIC PRIORITY

This application is a continuation of U.S. application Ser. No. 14/105,247 filed Dec. 13, 2013, the disclosure of which is incorporated by reference herein in its entirety.

BACKGROUND

The present invention relates generally to software-defined networking, and more specifically, to a software-defined networking interface between multiple platform managers.

Cloud computing distributes processing across multiple computing resources in a network. Cloud computing typically provides on-demand network access to a shared pool of configurable computing resources (e.g., networks, network bandwidth, servers, processing, memory, storage, applications, virtual machines, and services) that can be rapidly provisioned and released. The computing resources can include a variety of different computing platforms. Computing platforms include server-specific platform managers that locally control provisioning of computing and network resources. Each platform manager typically is customized for the particular hardware and software resources of the computing platform upon which it resides. Platform managers can define allocations for virtual machines, processing resources, memory, input/output flows, bandwidth requirements, and the like.

Platform managers for different computing platforms can include a number of similar functions but are not typically capable of being directly ported across computing platforms. Certain interfacing functions of the platform managers can conflict relative to other platform managers, making computing platform integration difficult particularly in a cloud computing environment.

SUMMARY

An aspect includes a computer-implemented method for a software-defined networking (SDN) interface between multiple platform managers is provided. The method includes receiving, at an SDN controller of a network, provisioning data from a first network provisioning application associated with a first platform manager of a first computing platform. Provisioning data are received at the SDN controller from a second network provisioning application associated with a second platform manager of a second computing platform. The SDN controller compares the provisioning data from the first network provisioning application to the provisioning data from the second network provisioning application to identify provisioning issues. The SDN controller determines a modified provisioning that resolves the provisioning issues. The SDN controller configures the network to comply with the modified provisioning. The modified provisioning is reported to the first and second network provisioning applications.

Another aspect includes a computer-implemented method for a network provisioning application in an SDN controlled network. The method includes providing, by a first network provisioning application associated with a first platform manager of a first computing platform, provisioning data to an SDN controller. A modified provisioning is received at the first computing platform from the SDN controller that resolves provisioning issues between the provisioning data of the first network provisioning application with provisioning data of a second network provisioning application associated with a second platform manager of a second computing platform. The first network provisioning application modifies a network policy of the first platform manager based on the modified provisioning. Resources of the first computing platform are allocated by the first platform manager according to the modified network policy.

According to a further aspect, a computer program product for an SDN interface between multiple platform managers is provided. The computer program product includes a tangible storage medium readable by a processing circuit and storing instructions for execution by the processing circuit for performing a method. The method includes receiving, at an SDN controller of a network, provisioning data from a first network provisioning application associated with a first platform manager of a first computing platform. Provisioning data are received at the SDN controller from a second network provisioning application associated with a second platform manager of a second computing platform. The SDN controller compares the provisioning data from the first network provisioning application to the provisioning data from the second network provisioning application to identify provisioning issues. The SDN controller determines a modified provisioning that resolves the provisioning issues. The SDN controller configures the network to comply with the modified provisioning. The modified provisioning is reported to the first and second network provisioning applications.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Exemplary embodiments include coordination of network traffic at an application level between two or more separately controlled computing platforms in a software-defined networking (SDN) controlled network. A network provisioning application on a computing platform isolates network-related functionality from a platform manager running on each computing platform. Provisioning data defining network-related functionality is provided from the network provisioning application to a provisioning resolver program operating on an SDN controller which resolves provisioning issues such as duplication or conflicts. Examples include two computing platforms allocating traffic to the same network links or similarly competing for other network resources. The provisioning resolver may also detect and resolve provisioning requests that are incompatible with capabilities of the network (e.g., requesting more bandwidth than can be allocated). The SDN controller determines a modified provisioning, configures the network accordingly, and reports the modified provisioning back to the computing platforms. The computing platforms can then modify their respective network policies and allocate resources accordingly. This overrides the default network policies of the platform managers of the computing platforms to reduce conflicts and optimize performance. Exemplary uses of embodiments can include server mirroring, cross-platform data transfer, cross-platform end-to-end performance monitoring, data center management, and cloud computing.

Rather than requiring platform managers of different computing platform types (e.g., different hardware and operating systems configurations) to know provisioning preferences about each other, the SDN controller acts as a provisioning resolver for the platform managers. The SDN controller can provision and control application-aware network traffic flows in a network in which several applications are running on computing platforms at substantially the same time. The system provides visibility of network traffic flows to SDN control logic, which is a program executed in an SDN controller that allocates bandwidth and resources. The SDN controller can also establish priority on a per-application basis based on flow classification. Header information in network traffic can be used to classify flows based on source, destination, protocol, and other such information.

Figure 1:
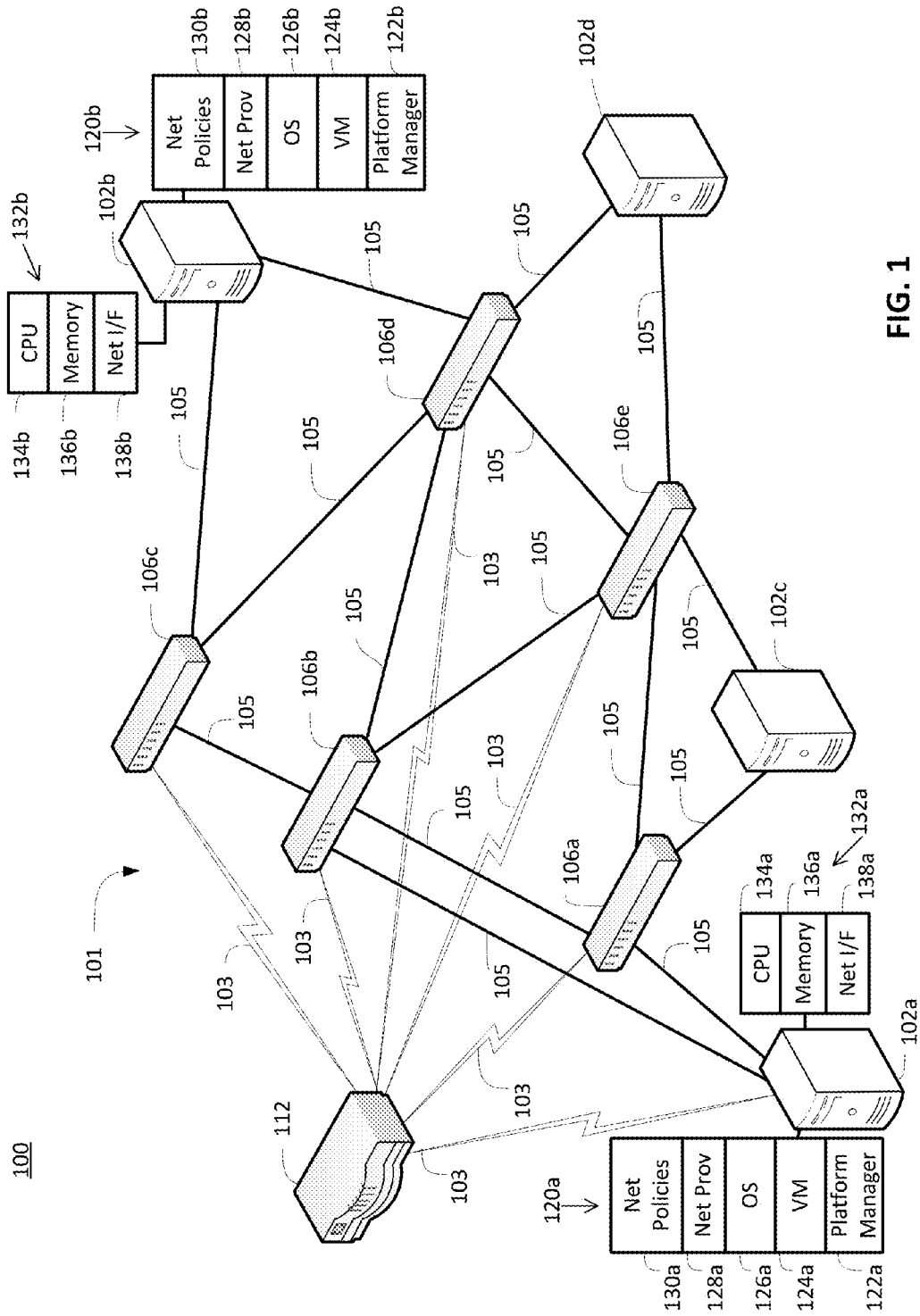
FIG. 1 depicts a system including a software-defined networking (SDN) interface between multiple platform managers in accordance with an embodiment.

Turning now to FIG. 1, an example of a system 100 including a network 101 that supports software-defined networking (SDN) will now be described in greater detail. In the example depicted in FIG. 1, the system 100 includes a plurality of servers 102 configured to communicate over the network 101 using switches 106 that are SDN-capable, e.g., OpenFlow-compatible. In FIG. 1, four servers 102a, 102b, 102c, and 102d and five switches 106a, 106b, 106c, 106d, and 106e are depicted for purposes of explanation; however, the scope of embodiments is not so limited and may include any number of servers 102 and switches 106. The network 101 can be geographically distributed between multiple physical locations. The network 101 can also include other systems and access points (not depicted), such as client systems and firewalls for local and/or external network access.

In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. One or more of the servers 102 may be storage system servers configured to access and store large amounts of data.

Multiple links 105 that can collectively form flows may be provided between the servers 102a-d and switches 106a-e. Each of the servers 102a-d can include a computing platform 120 including one or more of: a platform manager 122, a virtual machine 124, an operating system 126, a network provisioning application 128, and network policies 130. Each of the servers 102a-d can also include a plurality of computing resources 132, such as processing resources (e.g., CPUs) 134, memory 136, and network interfaces 138. The network interfaces 138 can include a number of channel adapters and buffers that may impact bandwidth, message sizing, and timing. For purposes of explanation, FIG. 1 only depicts exemplary details for servers 102a and 102b; however, it will be understood that servers 102c, 102d, and additional servers (not depicted) can include similar elements.

Server 102a may be referred to as a first server 102a with a first computing platform 120a, a first platform manager 122a, a first virtual machine 124a, a first operating system 126a, a first network provisioning application 128a, and first network policies 130a. The first server 102a may include first computing resources 132a such as first processing resources 134a, first memory 136a, and first network interfaces 138a. Server 102b may be referred to as a second server 102b with a second computing platform 120b, a second platform manager 122b, a second virtual machine 124b, a second operating system 126b, a second network provisioning application 128b, and second network policies 130b. The second server 102b may include second computing resources 132b such as second processing resources 134b, second memory 136b, and second network interfaces 138b.

In an exemplary embodiment, the servers 102a and 102b are of different types, where the first and second platform managers 122a and 122b apply different and possibly conflicting network management policies 130a and 130b to provisioning resources of the network 101. For instance, the first network provisioning application 128a can access the first network policies 130a and determine network provisioning that complies with the first platform manager 122a, and separately, the second network provisioning application 128b can access the second network policies 130b and determine network provisioning that complies with the second platform manager 122b. The data provisioning associated with the first and second network policies 130a, 130b may conflict or include duplication, such as conflicting flows relative to the servers 102c, 102d or between the servers 102a and 102b. In exemplary embodiments, the network provisioning applications 128a, 128b provide their respective provisioning data to an SDN controller 112 to resolve provisioning issues. The SDN controller 112 returns modified provisioning to the first and second computing platforms 120a, 120b that resolves provisioning issues. The first and second network provisioning applications 128a, 128b can respectively modify the first and second network policies 130b based on the modified provisioning.

The SDN controller 112 is a central software-defined networking controller configured to make routing and data movement decisions within the network 101. The SDN controller 112 establishes secure links 103 to configure the switches 106 and communication properties of links 105 between the switches 106. For example, the SDN controller 112 can configure the switches 106 to control packet routing paths for data flows between the servers 102. The SDN controller 112 can also configure the switches 106 to define flows between the servers 102, virtual machines 124, operating systems 126, and network provisioning applications 128 running on the servers 102. One or more secure links 103 may also be defined between the SDN controller 112 and the servers 102.

The servers 102 and SDN controller 112 can include various computer/communication hardware and software technology known in the art, such as one or more processing units or circuits, volatile and non-volatile memory including removable media, power supplies, network interfaces, support circuitry, operating systems, and the like. Although the SDN controller 112 is depicted as a separate component, it will be understood that SDN controller functionality can alternatively be implemented in one or more of the servers 102.

The network 101 can include a combination of wireless, wired, and/or fiber optic links. The network 101 as depicted in FIG. 1 represents a simplified example for purposes of explanation. For example, each of the links 105 depicted in the network 101 can include more than one physical link. Embodiments of the network 101 can include numerous switches 106 (e.g., hundreds) with dozens of ports and links per switch 106. The switches 106 are also referred to generally as network resources and may represent any type of device that is capable of forwarding data through one or more ports. The network 101 may support a variety of known communication standards that allow data to be transmitted between the servers 102, switches 106, and/or SDN controller 112. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports SDN as a layer-2 protocol. The switches 106 can be dedicated SDN switches or SDN-enabled general purpose switches that also support layer-2 and layer-3 Ethernet.

Figure 2:
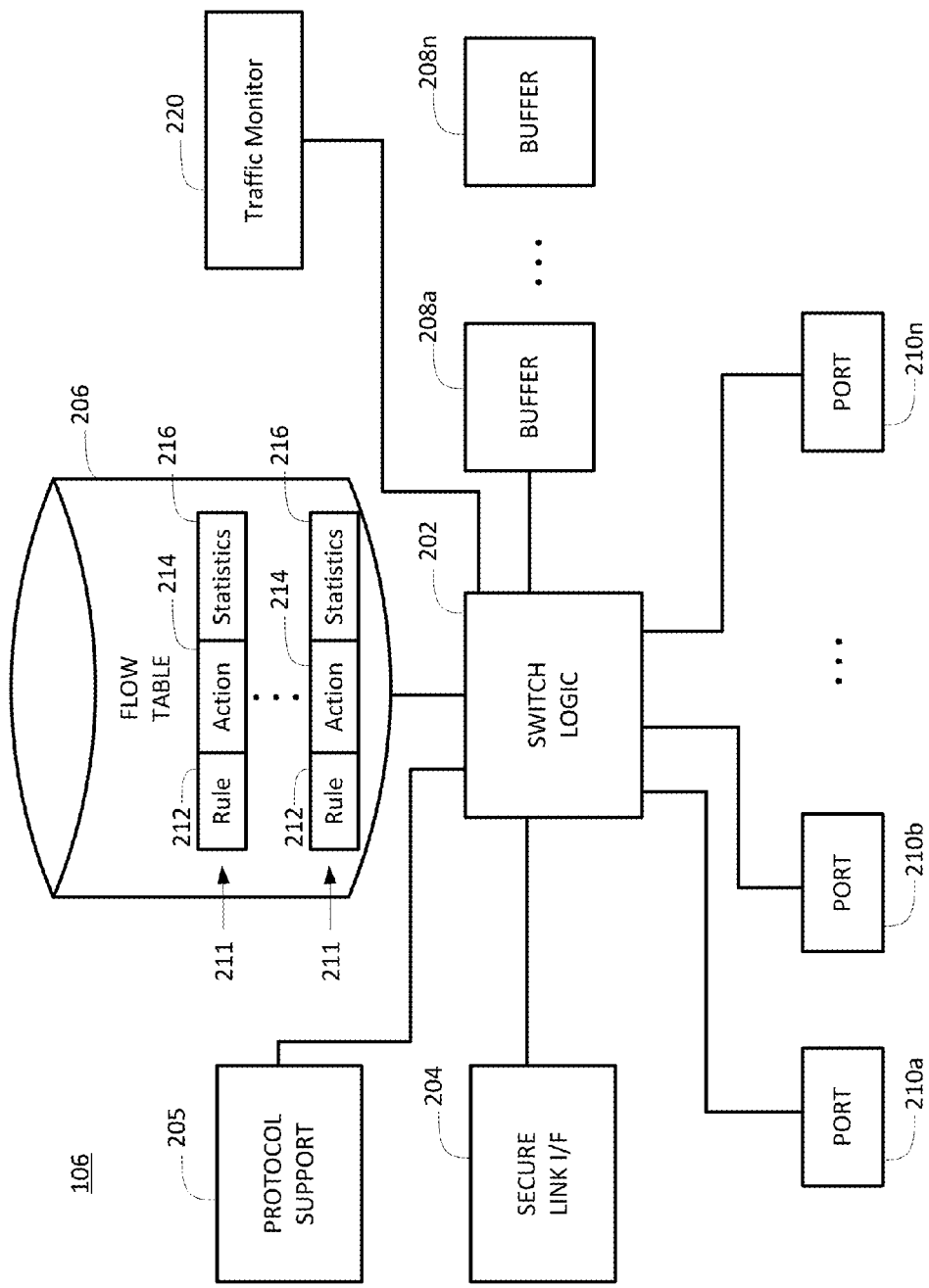
FIG. 2 depicts a block diagram of a switch of the system of FIG. 1 according to an embodiment.

FIG. 2 depicts a block diagram of one of the switches 106a-e of FIG. 1 that supports SDN as switch 106. The switch 106 of FIG. 2 includes switch logic 202, secure link interface 204, protocol support 205, flow table 206, buffers 208a-208n, and ports 210a-210n. The switch 106 can also include traffic monitor 220 to monitor network traffic locally to determine network traffic performance metrics and provide the network traffic performance metrics to the SDN controller 112 of FIG. 1. The switch logic 202 may be implemented in one or more processing circuits, where a computer readable storage medium is configured to hold instructions for the switch logic 202 and/or the traffic monitor 220, as well as various variables and constants to support operation of the switch 106. The switch logic 202 forwards network traffic (e.g., packets) between the ports 210a-210n as flows defined by the SDN controller 112 of FIG. 1.

The secure link interface 204 connects the switch 106 to the SDN controller 112 via a secure link 103 of FIG. 1. The secure link interface 204 allows commands and packets to be communicated between the SDN controller 112 and the switch 106 using an SDN protocol. The secure link interface 204 can be controlled by executable instructions stored within the switch 106. Protocol details to establish a protocol definition for an implementation of SDN and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide SDN as an enhancement to existing conventional routers or switches.

The flow table 206 defines supported connection types associated with particular addresses, virtual local area networks or switch ports, for example. A flow may be defined as all network traffic that matches a particular header format, including use of wildcards. Each entry 211 in the flow table 206 can include one or more rules 212, actions 214, and statistics 216 associated with a particular flow. The rules 212 define each flow and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210a-210n (e.g., unicast or multicast), encapsulating and forwarding packets of a flow to the SDN controller 112 of FIG. 1, and dropping packets of the flow. Entries 211 in the flow table 206 can be added and removed by the SDN controller 112 of FIG. 1 via the secure link interface 204. The SDN controller 112 of FIG. 1 can pre-populate the entries 211 in the flow table 206. Additionally, the switch 106 can request creation of an entry 211 from the SDN controller 112 upon receiving a flow without a corresponding entry 211 in the flow table 206.

The buffers 208a-208n provide temporary storage in queues for flows as network traffic is sent between the ports 210a-210n. In a lossless configuration, rather than dropping packets of network traffic when network congestion is present, the buffers 208a-208n temporarily store packets until the associated ports 210a-210n and links 105 of FIG. 1 are available. Each of the buffers 208a-208n may be associated with a particular port, flow, or sub-network. Each of the buffers 208a-208n is logically separate but need not be physically independent. Accordingly, when one of the buffers 208a-208n is full, it does not adversely impact the performance of the other buffers 208a-208n within the switch 106.

Figure 3:
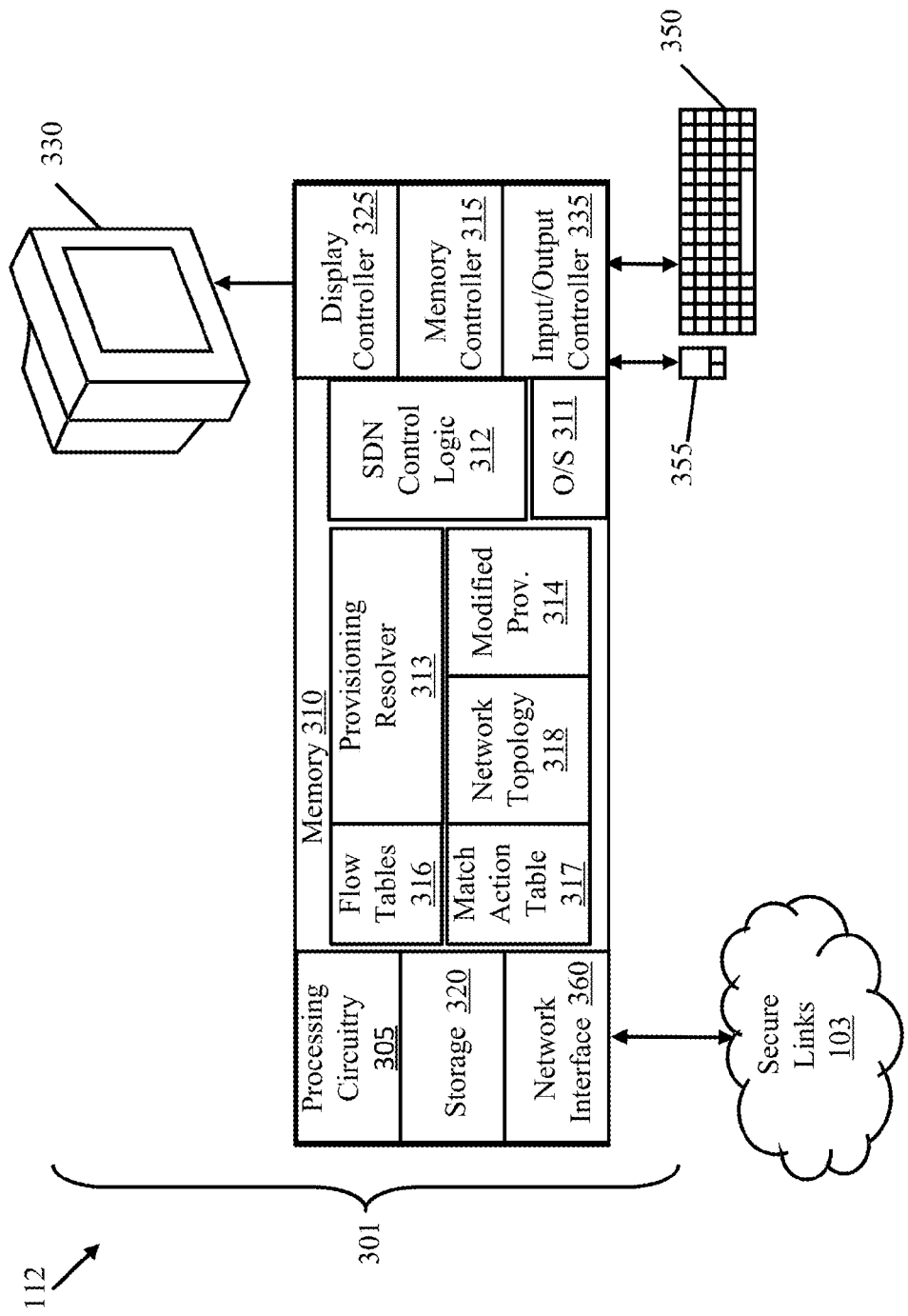
FIG. 3 depicts a block diagram of an SDN controller of the system of FIG. 1 in accordance with an embodiment.

FIG. 3 depicts a block diagram of the SDN controller 112 of FIG. 1 according to an embodiment. The SDN controller 112 can be embodied in any type of processing system and is depicted embodied in a general-purpose computer 301 in FIG. 3. The servers 102a-d of FIG. 1 can also include similar computer elements as depicted in the computer 301 of FIG. 3.

In an exemplary embodiment, in terms of hardware architecture, as shown in FIG. 3, the computer 301 includes processing circuitry 305 and memory 310 coupled to a memory controller 315, and an input/output controller 335. The input/output controller 335 can be, for example but not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the computer 301 may include address, control, and/or data connections to enable appropriate communications among the aforementioned components.

In an exemplary embodiment, a conventional keyboard 350 and mouse 355 or similar devices can be coupled to the input/output controller 335. Alternatively, input may be received via a touch-sensitive or motion sensitive interface (not depicted). The computer 301 can further include a display controller 325 coupled to a display 330.

The processing circuitry 305 is a hardware device for executing software, particularly software stored in storage 320, such as cache storage, or memory 310. The processing circuitry 305 can be any custom made or commercially available computer processor, a central processing unit (CPU), an auxiliary processor among several processors associated with the computer 301, a semiconductor-based microprocessor (in the form of a microchip or chip set), a macro-processor, or generally any device for executing instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), disk, hard disk drive, diskette, cartridge, cassette or the like, etc.). Moreover, the memory 310 may incorporate electronic, magnetic, optical, and/or other types of storage media. Accordingly, the memory 310 is an example of a tangible computer readable storage medium upon which instructions executable by the processing circuitry 305 may be embodied as a computer program product. The memory 310 can have a distributed architecture, where various components are situated remote from one another, but can be accessed by the processing circuitry 305.

The instructions in memory 310 may include one or more separate programs, each of which comprises an ordered listing of executable instructions for implementing logical functions. In the example of FIG. 3, the instructions in the memory 310 include a suitable operating system (OS) 311, SDN control logic 312, and a provisioning resolver 313. The operating system 311 essentially controls the execution of other computer programs and provides scheduling, input-output control, file and data management, memory management, and communication control and related services. Although depicted separately, the SDN control logic 312 and provisioning resolver 313 can be combined or further subdivided. When the computer 301 is in operation, the processing circuitry 305 is configured to execute instructions stored within the memory 310, to communicate data to and from the memory 310, and to generally control operations of the computer 301 pursuant to the instructions.

In an exemplary embodiment, the computer 301 can further include a network interface 360 for coupling to the secure links 103 of the network 101 of FIG. 1. The network interface 360 and components of the network 101 of FIG. 1 can be configured by the SDN control logic 312 according to flow tables 316, a match action table 317, a network topology 318, and a modified provisioning 314. The network topology 318 defines characteristics of the network 101 of FIG. 1, such as network resource details (e.g., bandwidth, physical connections available, virtual connections, resource constraints) of the servers 102, links 105, and switches 106 of FIG. 1. The flow tables 316 can be created based on the network topology 318 and modified based on changes in the modified provisioning 314. The flow tables 316 can be defined for each of the switches 106 of FIG. 1 and deployed as instances of the flow table 206 of FIG. 2 including mapping to specific ports 210a-210n of FIG. 2. The match action table 317 can be used to define specific conditions for the actions 214 in the flow table 206 of FIG. 2 and link flows across multiple switches 106 of FIG. 1. The match action table 317 may include rules for particular internet protocol (IP) addresses, media access control (MAC) addresses, virtual machine identifiers (e.g., for virtual machine 124), operating system identifiers (e.g., for operating system 126) and/or workload identifiers (e.g., for an application on a computing platform 120), and match associated actions across the flow tables 316.

Upon detecting or receiving network traffic performance metrics from instances of the traffic monitor 220 of FIG. 2, the provisioning resolver 313 can modify one or more of the modified provisioning 314, flow tables 316, match action table 317, and network topology 318 to improve overall performance of the network 101 of FIG. 1. Accordingly, the provisioning resolver 313 can update the modified provisioning 314, flow tables 316, match action table 317, and network topology 318 to reflect differing data flow needs for various events. For instance, the match action table 317 may include time-based rules to shift data flow bandwidth between the computing platforms 120 of FIG. 1 for expected shifts in peak operating demands. Changes made to provisioning data provided by the computing platforms 120 of FIG. 1 based on provisioning issues between the computing platforms 120 or optimizations based on monitored network performance are reflected in the modified provisioning 314 and reported back to the computing platforms 120.

Figure 4:
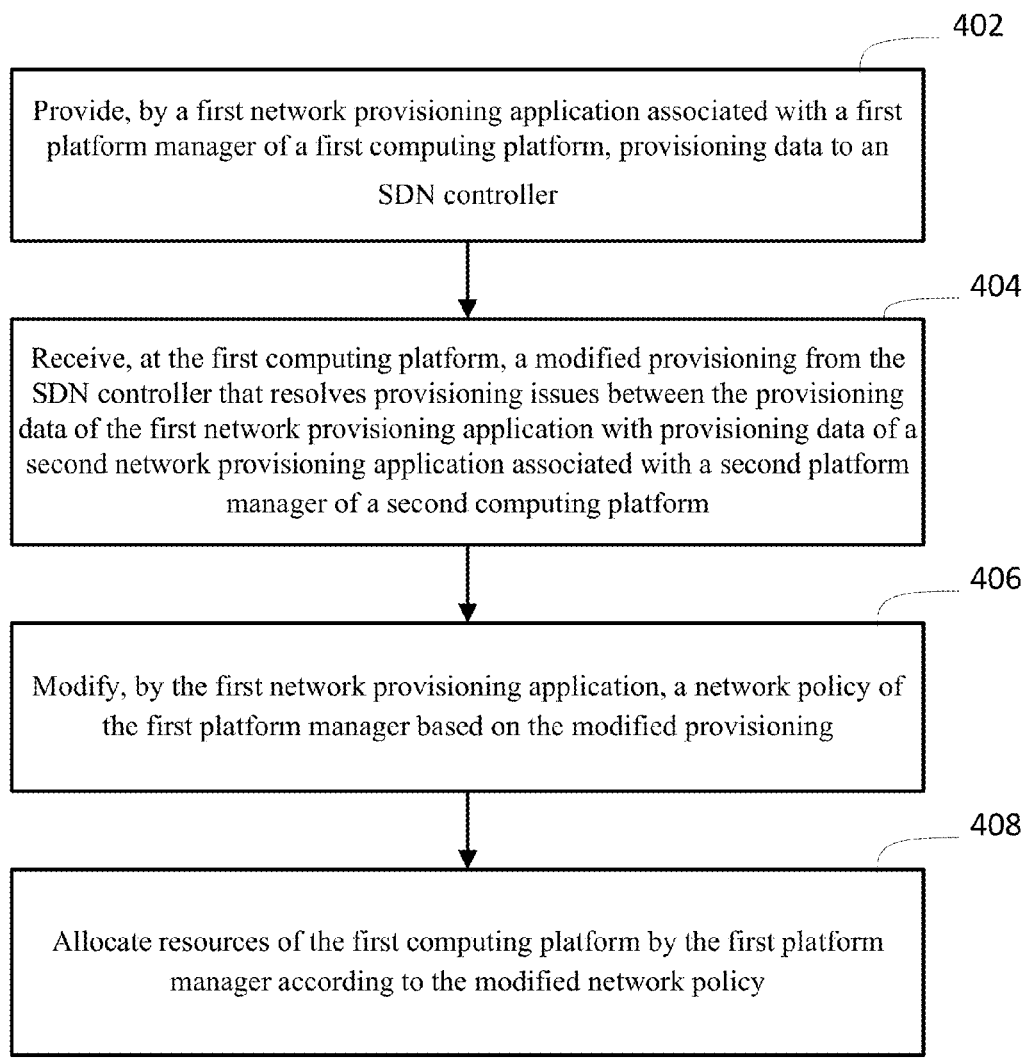
FIG. 4 depicts a process flow for a network provisioning application in accordance with an embodiment.

FIG. 4 depicts a process 400 for a network provisioning application in an SDN controlled network as a computer-implemented method in accordance with an embodiment. The process 400 is also described in reference to FIGS. 1-3 and can be implemented by the system 100 of FIG. 1.

At block 402, a first network provisioning application 128a associated with a first platform manager 122a of a first computing platform 120a provides provisioning data to an SDN controller 112. At block 404, a modified provisioning 314 is received at the first computing platform 120a from the SDN controller 112 that resolves provisioning issues between the provisioning data of the first network provisioning application 128a with provisioning data of a second network provisioning application 128b associated with a second platform manager 122b of a second computing platform 120b. At block 406, the first network provisioning application 128a modifies a network policy (e.g., one or more of the network policies 130a) of the first platform manager 122a based on the modified provisioning 314. At block 408, resources, such as computing resources 132a, of the first computing platform 120a are allocated by the first platform manager 122a according to the modified network policy in the network policies 130a. The process 400 can be performed in parallel at each of the computing platforms 120 to update their respective network policies 130.

The provisioning data can include one or more of: a provisioning for network layer-2 attributes, a provisioning for network layer-3 attributes, a provisioning for network security profiles, a provisioning for network traffic on specific links 105 to support redundancy, and a provisioning for network traffic on specific links 105 to support load balancing. The modified provisioning 314 may define a pooling and virtualization of network resources relative to at least the first and second computing platforms 120a and 120b.

Figure 5:
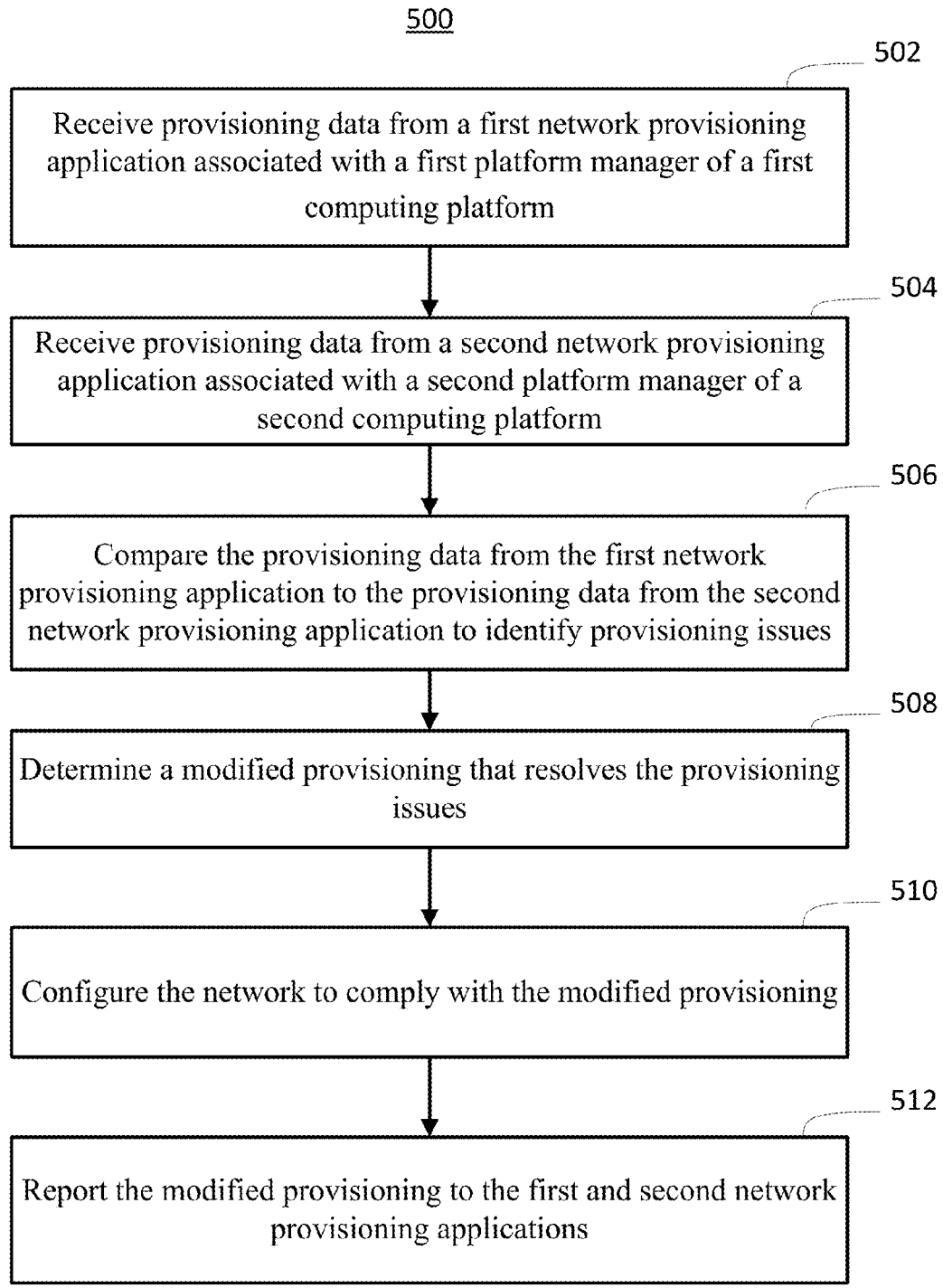
FIG. 5 depicts a process flow for an SDN controller to provide an SDN interface between multiple platform managers in accordance with an embodiment.

FIG. 5 depicts a process 500 for an SDN interface between multiple platform managers as a computer-implemented method in accordance with an embodiment. The process 500 is also described in reference to FIGS. 1-3 and can be implemented by the system 100 of FIG. 1. At block 502, the SDN controller 112 receives provisioning data from a first network provisioning application 128a associated with a first platform manager 122a of a first computing platform 120a. At block 504, the SDN controller 112 receives provisioning data from a second network provisioning application 128b associated with a second platform manager 122b of a second computing platform 120b.

At block 506, the SDN controller 112 compares the provisioning data from the first network provisioning application 128a to the provisioning data from the second network provisioning application 128b to identify provisioning issues. The provisioning issues can include allocating a same link 105 in the network 101 by both the first and second network provisioning applications 128a and 128b. As a further example, the provisioning issues may include allocating at least one network resource beyond a capability supported by the network 101, such as collectively provisioning more bandwidth than can be supported at a particular switch 106.

At block 508, the SDN controller 112 determines a modified provisioning 314 that resolves the provisioning issues. The modified provisioning 314 can include pooling and virtualization of network resources. Pooling of network resources can make unused bandwidth of one or more links 105 available for other flows to use. Virtualization can further partition physical resources to share bandwidth and buffers, for example.

At block 510, the SDN controller 112 configures the network 101 to comply with the modified provisioning 314.

Configuring the network 101 can include updating a network topology 318, by the SDN controller 112, to align with the modified provisioning 314. Updates to the network topology 318 are translated into one or more flow tables 316. The one or more flow tables 316 are loaded into one or more associated switches 106 in the network 101. At block 512, the modified provisioning 314 is reported to the first and second network provisioning applications 128a and 128b.

The SDN controller 112 may also receive network traffic performance metrics (e.g., from traffic monitor 220) and determine whether network topology 318 updates are needed based on the network traffic performance metrics. The SDN controller 112 can update the modified provisioning 314 based on determining that updates to the network topology 318 are needed. Updates can include changing assignments of particular ports 210a-n and links 105 between the servers 102. The provisioning resolver 313 can identify one or more network provisioning applications 128 impacted by the update of the modified provisioning 314. The provisioning resolver 313 may report the update of the modified provisioning 314 to the one or more impacted network provisioning applications 128.

Technical effects and benefits include providing a software-defined networking interface between multiple platform managers. The SDN controller leverages its centralized role in creating and managing flows through the network to resolve provisioning conflicts and optimize provisioning of network resources between multiple platform managers in the network.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as a latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for a software-defined networking (SDN) interface between multiple platform managers, the method comprising:
receiving, at an SDN controller of a network, provisioning data from a first network provisioning application associated with a first platform manager of a first computing platform based on a first network policy defined to accommodate a first computing resource allocation of the first platform manager;
receiving, at the SDN controller, provisioning data from a second network provisioning application associated with a second platform manager of a second computing platform based on a second network policy defined to accommodate a second computing resource allocation of the second platform manager;
comparing, by the SDN controller, the provisioning data from the first network provisioning application to the provisioning data from the second network provisioning application to identify provisioning issues;
determining, by the SDN controller, a modified provisioning that resolves the provisioning issues;
configuring the network, by the SDN controller, to comply with the modified provisioning;
reporting the modified provisioning to the first and second network provisioning applications to modify the first computing resource allocation according to a modification of the first network policy based on the modified provisioning and modify the second computing resource allocation according to a modification of the second network policy based on the modified provisioning;
applying, by the SDN controller, a plurality of time-based rules from a match action table to shift data flow bandwidth between the first computing platform and the second computing platform based on expected shifts in peak operating demands;
receiving network traffic performance metrics at the SDN controller;
determining, by the SDN controller, whether network topology updates are needed based on the network traffic performance metrics;
updating the modified provisioning, by the SDN controller, based on determining that updates to the network topology are needed; and
adjusting the match action table based on the network traffic performance metrics.

2. The method of claim 1, wherein the provisioning issues include allocating a same link in the network by both the first and second network provisioning applications.

3. The method of claim 1, wherein the provisioning issues include allocating at least one network resource beyond a capability supported by the network.

4. The method of claim 1, wherein configuring the network further comprises:
updating the network topology, by the SDN controller, to align with the modified provisioning;
translating updates to the network topology into one or more flow tables; and
loading the one or more flow tables into one or more associated switches in the network.

5. The method of claim 1, further comprising:
identifying one or more network provisioning applications impacted by the update of the modified provisioning; and
reporting the update of the modified provisioning to the one or more impacted network provisioning applications.

6. The method of claim 1, wherein the modified provisioning comprises pooling and virtualization of network resources.

7. The method of claim 1, wherein the provisioning data from the first and second network provisioning applications comprises one or more of:
a provisioning for network layer-2 attributes;
a provisioning for network layer-3 attributes;
a provisioning for network security profiles;
a provisioning for network traffic on specific links to support redundancy; and
a provisioning for network traffic on specific links to support load balancing.

8. The method of claim 1, further comprising:
providing, by the first computing platform, the provisioning data to the SDN controller;
receiving, at the first computing platform, the modified provisioning from the SDN controller;
modifying, by the first network provisioning application, the first network policy of the first platform manager based on the modified provisioning; and
performing a modification of the first computing resources allocation of the first computing platform by the first platform manager according to the modified network policy as one of a processing resource and memory allocation adjustment.

9. The method of claim 8, wherein the provisioning data comprises one or more of:
a provisioning for network layer-2 attributes;
a provisioning for network layer-3 attributes;
a provisioning for network security profiles;
a provisioning for network traffic on specific links to support redundancy; and
a provisioning for network traffic on specific links to support load balancing.

10. The method of claim 8, wherein the modified provisioning defines a pooling and virtualization of network resources relative to at least the first and second computing platforms.

11. A computer program product for a software-defined networking (SDN) interface between multiple platform managers, the computer program product comprising:

a non-transitory storage medium readable by a processing circuit and storing instructions for execution by the processing circuit for performing a method comprising:

receiving, at an SDN controller of a network, provisioning data from a first network provisioning application associated with a first platform manager of a first computing platform based on a first network policy defined to accommodate a first computing resource allocation of the first platform manager;

receiving, at the SDN controller, provisioning data from a second network provisioning application associated with a second platform manager of a second computing platform based on a second network policy defined to accommodate a second computing resource allocation of the second platform manager;

comparing, by the SDN controller, the provisioning data from the first network provisioning application to the provisioning data from the second network provisioning application to identify provisioning issues;

determining, by the SDN controller, a modified provisioning that resolves the provisioning issues;

configuring the network, by the SDN controller, to comply with the modified provisioning;

reporting the modified provisioning to the first and second network provisioning applications to modify the first computing resource allocation according to a modification of the first network policy based on the modified provisioning and modify the second computing resource allocation according to a modification of the second network policy based on the modified provisioning;

applying, by the SDN controller, a plurality of time-based rules from a match action table to shift data flow bandwidth between the first computing platform and the second computing platform based on expected shifts in peak operating demands;

receiving network traffic performance metrics at the SDN controller;

determining, by the SDN controller, whether network topology updates are needed based on the network traffic performance metrics;

updating the modified provisioning, by the SDN controller, based on determining that updates to the network topology are needed; and adjusting the match action table based on the network traffic performance metrics.

12. The computer program product of claim 11, wherein the provisioning issues include allocating a same link in the network by both the first and second network provisioning applications.

13. The computer program product of claim 11, wherein the provisioning issues include allocating at least one network resource beyond a capability supported by the network.

14. The computer program product of claim 11, wherein configuring the network further comprises:

updating the network topology, by the SDN controller, to align with the modified provisioning;

translating updates to the network topology into one or more flow tables; and loading the one or more flow tables into one or more associated switches in the network.

15. The computer program product of claim 11, further comprising:

identifying one or more network provisioning applications impacted by the update of the modified provisioning; and reporting the update of the modified provisioning to the one or more impacted network provisioning applications.

16. The computer program product of claim 11, wherein the modified provisioning comprises pooling and virtualization of network resources.

17. The computer program product of claim 11, wherein the provisioning data from the first and second network provisioning applications comprises one or more of:

a provisioning for network layer-2 attributes;
a provisioning for network layer-3 attributes;
a provisioning for network security profiles;
a provisioning for network traffic on specific links to support redundancy; and
a provisioning for network traffic on specific links to support load balancing.

* * * * *